Re. 25082

May 7, 1957 R. C. HERGENROTHER 2,791,626

COLOR KINESCOPE

Filed May 25, 1954

INVENTOR
RUDOLF C. HERGENROTHER
BY Elmer J. Gorn
ATTORNEY

United States Patent Office 2,791,626

Patented May 7, 1957

2,791,626

COLOR KINESCOPE

Rudolf C. Hergenrother, West Newton, Mass., assignor to Raytheon Manufacturing Company, Waltham, Mass., a corporation of Delaware Application May 25, 1954, Serial No. 432,147

17 Claims. (Cl. 178—5.4)

This invention relates to color kinescopes and, more particularly, relates to means for coordinating the position of an electron beam on the fluorescent screen of a color kinescope and a corresponding color input signal.

One form of color kinescope now in use includes a fluorescent screen carrying a plurality of vertically disposed phosphor elements or strips. These phosphor strips are arranged in groups of three with each element of the group capable of emitting light of a different primary color when impinged upon by an electron beam. As the electron beams scans across the phosphor strips at a substantially constant rate, determined by the parameters of the horizontal deflection circuit, the various phosphor strips fluoresce, respectively, in a color sequence such as red, green, and blue, or in any other sequence desired, depending upon the order of arrangement of the phosphor elements of each group or triplet.

A plurality of trains of color video signals are derived from the color television receiver, each one representative of the primary component colors of the scene being televised. For example, in the usual tri-color system there are three separate color video signals, which are indicative of the red, green, and blue components, respectively, of the televised scene. The number of separate color video signals corresponds to the number of phosphor elements in a group and the information conveyed by each of the video signals corresponds to the color of light emitted by a corresponding phosphor strip in each group. The relative amplitudes of these color video signals are a function of the light intensity of the respective component colors present in the televised scene.

In this system each color video signal is applied sequentially to the intensity control grid of the kinescope while the electron beam is moving past the phosphor strip corresponding to that color. For example, the red video signal should be applied to the electron gun only while the electron beam is traversing the red-light emitting phosphor strip on the fluorescent screen. In order to recurrently supply the separate color video signals one at a time and in a pre-determined sequence to the intensity grid, a color coding device is used. The color coder is continuously supplied with the three separate color video signals and is adapted to permit the passage therethrough of but one color signal at a time. The kinescope grid is thus cyclically receptive of a given color video signal. In the usual tri-color system, all three video signals are supplied to the kinescope grid during an interval of time substantially equal to that taken for the electron beam to traverse each color triplet.

In actual practice, the electron beam position during the presence of video information corresponding to a given color will not remain in exact registration with the appropriate phosphor strip of the fluorescent screen because of such factors as irregularities in either the beam scanning rate or in disposition of the color triplets on the fluorescent screen, or both.

The purpose of this invention is to achieve the required coordination between the position of the electron beam on the fluorescent screen and the receipt of corresponding color video information. Means are provided for producing signals representative of the instantaneous position of the electron beam on the fluorescent screen as the beam is scanned across the phosphor strips of the screen. These signals, which hereinafter will be referred to as "scan-register signals," are fed to the color coder. This color coder, which essentially is a gating circuit, is periodically receptive of the scanned register signals in addition to being continuously supplied with the three incoming color video signals; in response to the receipt of each incoming scan-register signal, the color coder gates the various color video signals to the intensity control grid of the electron gun.

The means for producing the scan-register signals includes an electron beam intercepting electrode, otherwise referred to as a scan-register grid, which includes a multiplicity of spaced, electrically interconnected elements, referred to hereinafter as "signal elements," which are spaced from the fluorescent screen which is covered with an electrically-conductive coating and biased negative with respect thereto. These signal elements may be in the form of wires or strips which are aligned parallel to and in register with appropriate ones of the phosphor strips of said fluorescent screen. These signal elements emit secondary electrons when impinged upon by a scanned electron beam and pulses of current flowing through an output circuit during the traversal of said beam past these elements provides scan-register signals. By spacing the signal elements of the scan-register grid from the fluorescent screen coating, and by maintaining the scan-register grid sufficiently negative relative to the fluorescent screen coating, all signals except those produced when the beam impinges upon the various signal elements are suppressed. The scan-register signals thus are effectively separated from the video signals, thereby avoiding the use of electrical circuitry for separating the scan-register signals from the video information prior to application of the scan-register signals to the color coder.

In order to obtain a scan-register signal, the electron beam must be turned on. If, however, the televised scene has black areas therein, or areas in which a particular color is absent, the beam current becomes zero in these areas and, if no special provision is made, no scan-register signals will be produced in such areas. This will result in difficulties at the edges of dark areas since no scan-register signal will precede the transition from a dark area to a light one. Furthermore, in areas of the picture where the luminance is low, the beam current may become so small that the resulting low level of the scan-register signal will be inadequate for firm control of the color coder. If, on the other hand, the electron beam is turned on in order to obtain the scan-register signal, a gratuitous excitation of the fluorescent screen of ordinary color kinescopes would be produced.

These difficulties can be overcome by designing the color coder so that once during each coding cycle a fixed reference potential or bias is applied to the grid of the electron gun, which is independent of the presence or amplitude of the color signal or signals, and by using a blank strip on the fluorescent screen between each group of three color strips and positioned in alignment with the signal elements of the scan-register grid. The programming sequence for the color coding is such that, when the coder is triggered by a scan-register signal, it will gate successively the red, green, and blue signals and then will set the beam at a certain reference level. The time intervals are arranged so that the color gating occurs when the beam is traversing the respective color strips and the reference voltage is applied to the intensity control grid while the beam is passing across the blank strip. With this arrangement, the scan-register signals will be of substantially constant amplitude and will cause the color coder to function independently of the presence or amplitude of the color signal, while the presence of the blank strip will prevent the bias level beam current from producing undesired illumination of the fluorescent screen during the interval in which only a scan-register signal is derived.

Although the presence of the blank strip will lower the allowable duty cycle of the fluorescent strips and will cause these strips to be narrower than otherwise, at least part of the blank strip would have been shadowed by the scan-register grid elements in any event.

If the fluorescent screen coating is maintained at a potential (relative to some fixed reference potential such as that of the cathode) which is several times that of the scan-register grid potential (relative to said reference potential) the electron beam will now be converged or focussed between each pair of signal elements of the scan-register grid by the accelerating electric field between the fluorescent screen coating and the scan-register grid. In order to provide proper convergence upon the individual strips of a given color group, a grid wire or element will be required for each separate color phosphor strip. If a blank strip is positioned between each group of three-color strips, there will be four grid wires or signal elements for each group of color strips. This means that four impulses will be produced for each group or triplet of color strips. If these impulses are of equal amplitude, an ambiguity will result in the color coder concerning color selection. This ambiguity can be resolved if every fourth impulse is caused to have a different amplitude from that of the other three adjacent signals. This may be done either by making every fourth signal element larger than the adjacent ones, or by having all signal elements of the same size but with every fourth element coated with a material having a markedly different secondary emission ratio than that of the adjacent elements. In either case the color coder programming sequence would be keyed by the large amplitude impulse which would serve as the scan-register signal.

Another scan-register grid may consist of a series of spaced strips disposed in electrical contact with the fluorescent screen coating and made of an electrically-conductive material having a secondary emission ratio considerably different from that of the material of the fluorescent screen coating. If the coating is made sufficiently negative relative to the accelerating anode or aquadag, secondary emission of electrons from the scan-register grid to the anode when the signal elements of the scan-register grid are struck by the electron beam will reach saturation. If a constant current electron beam is scanned across the fluorescent screen, a pulse of current will be produced whenever the beam crosses one of the metal strips of the scan-register grid. These pulses which comprise the scan-register signals will be superimposed on the modulation produced by the color video signals when a color picture is being reproduced. By locating the signal elements of the scan-register grid opposite a blank strip on the fluorescent screen, in the manner already described, the color coding may be initiated without producing undesired illumination of the fluorescent screen during the actuation of said coder; moreover, the scan-register signals will be of constant amplitude and will cause the color coder to function independently of the presence or amplitude of the color video signals, provided, of course, that the video information and scan-register signals are first separated.

The principles of operation and the objects of this invention will be appreciated from a consideration of the drawing in which.

Figure 1:
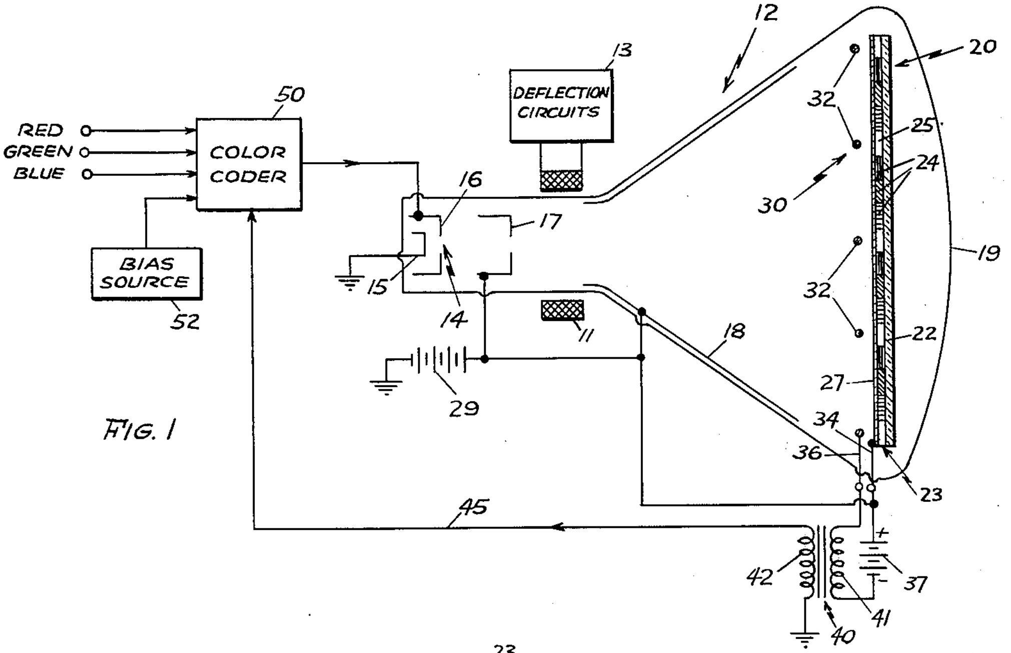
Fig. 1 illustrates an embodiment of the subject invention in which a single scan-register grid element is used for each color group.

Referring to Fig. 1, the cathode ray tube 12 is shown which includes an electron gun 14 comprising a cathode 15, electron beam intensity control grid 16, focussing and accelerating anode 17 and an accelerating anode 18 which may consist of an electrically-conductive coating on the inner wall of the tube envelope. Tube 12 also includes horizontal and vertical deflection coils 11 receptive of signals from appropriate horizontal and vertical deflection circuits 13.

Mounted near the viewing face 19 of tube 12 is a target electrode 20 which includes a rigid supporting member 22 which may be made of glass mica, or any other material capable of transmitting light, a fluorescent screen 23 and an electrically-conductive, electron-permeable layer or coating 27 on said fluorescent screen. The fluorescent screen may, in some cases, be deposited directly upon the viewing face of the tube; in this case the supporting member 22 may be eliminated. The thickness of the layers 23 and 27 of the target electrode 20 is greatly exaggerated in the interest of clarity of illustration.

Coating 27 preferably is made of aluminum which may be applied by a process of evaporation under a vacuum. Coating 27 serves as an electrode to which one terminal of a high-voltage source 29 may be connected. The anode 18 and coating 27 are maintained at the same high potential in order to prevent flow of secondary electrons from the fluorescent screen coating to the anode.

Fluorescent screen 23 consists of a plurality of groups or triplets of vertically-disposed phosphor strips or areas 24 capable of emitting red, green, and blue light, respectively, as indicated by the cross-hatching whenever an electron beam impinges thereupon. The groups of phosphor strips are repetitively arranged over the target area with the strips preferably normal to the direction of line scanning in order to obtain the maximum resolving power. The electron beam may be permitted to scan the phosphor strips at an angle other than 90 degrees provided that reduced resolving power may be tolerated. Since line scanning is horizontal in television systems now in general use, the phosphor strips preferably are arranged vertically.

Spaced between adjacent groups or triplets of the fluorescent screen is an elongated blank strip or area 25 which either is uncoated or contains a deposited material which does not phosphoresce in the visible spectrum. The elongated regions lying between color triplets will be referred to in the specification and claims either as blank strips or blank areas.

Although the groups of color strips so far described have been tertiary groups comprising the colors red, green, and blue, it should be understood that this invention is not so limited. The number of phosphor strips and the color emission thereof will depend upon the number of primary component colors selected for the television system being considered.

A scan-register grid 30 is spaced from the fluorescent screen and comprises a plurality of spaced signal elements 32 which are electrically interconnected. The signal elements 32 may be in the form of wires stretched on an insulated metal frame which comes out to a separate terminal. The signal elements or grid wires are arranged parallel to and in alignment with the blank strips 25 of the fluorescent screen. Lead 34 connected to fluorescent screen coating 27 and lead 36 connected to the scan-register grid 30 provide for connection to circuitry externally of the tube.

The scan-register grid 30 is biased negatively relative to the fluorescent screen coating 27 by means of a unidirectional voltage source 37 which is connected in series with the primary 41 of transformer 40 across electrodes 27 and 30. If the scan-register grid 30 is biased negatively relative to the aluminum coating 27, the scan-register grid will not intercept secondary electrons emitted from the aluminum coating but the aluminum coating will receive secondary electrons emitted from the signal elements 32 of the grid 30 as the beam sweeps across said elements. Thus a scan-register signal is obtained which is free of video signal components. It has been found that a bias voltage of the order of magnitude of 50 to 100 volts is generally sufficient.

The secondary emission current above described circulates in the primary 41 of transformer 40 and a scan-register output signal in the form of a pulse is derived across the terminals of transformer secondary winding 42 each time the electron beam impinges upon a signal element 32. This scan-register signal is supplied by means of transmission line 45 to a color coder 50, to be described subsequently.

The capacity between the scan-register grid 30 and the fluorescent screen coating 27 should be relatively low in order that the high frequency components necessary for the production of a sharp scan-register pulse are not attenuated unduly. The spacing between the scan-register grid and the fluorescent screen coating, therefore, should be as large as is convenient. The aforesaid capacity may be reduced further by decreasing the diameter or size of the grid wires; however, this is accompanied by a slight decrease in scan-register signal current.

The color coder 50 is an electrical commutating device actuated by a scan-register signal and having input terminals to which the various color video signals and reference signals are applied. For example, coder 50 may consist of a plurality of gate circuits associated either with counter circuits or delay lines and sequentially energized in response to an incoming scan-register signal. Upon the arrival of each scan-register signal at the input to color coder 50, the red video signal is first supplied to the intensity grid 16 of the tube. A time delay in the coding or sampling process may be introduced between the initial receipt of the scan-register signal and the application of the red video signal to the grid of the tube corresponding to the time taken for the beam to scan the distance between the signal grid and the leading edge of the red phosphor strip. The expression "leading edge" refers to the edge of a given strip first traversed by the scanning beam, and the expression "trailing edge" corresponds to the last portion of the strip to be scanned. During a period of time equal to that required for the beam to traverse the green phosphor strip, the coder will be conditioned to pass the green video signal and then the coder will pass the blue video signal during the time that the beam is traversing the blue phosphor strip. During the remainder of the coding period, during which the beam is scanning the blank strip, the coder will pass a fixed level bias signal from bias source 52, which may be a battery or other generator of constant amplitude unidirectional voltage.

The order of coding just referred to is illustrative only and any order of arrangement of the phosphor strips is possible, provided that the programming sequence in the color coder is made to correspond.

Figure 2:
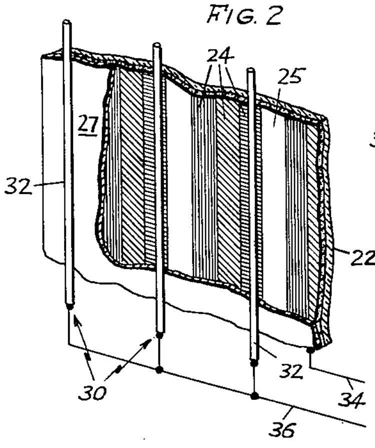
Fig. 2 is a fragmentary view showing in detail the relation between the scan-register grid and the fluorescent screen.
Figure 3:
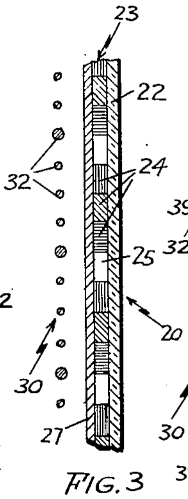
Figs. 3 and 4 illustrate modifications of the scan-register grid of Figs. 1 and 2 used in applications involving post-deflection focussing.
Figure 4:
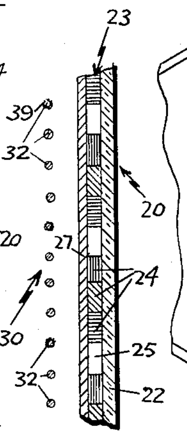

In Figs. 3 and 4 the relationship of the scan-register grid to the phosphor strips and blank strips of the fluorescent screen is shown for applications involving post-deflection focussing. If the coating 27 is maintained at a voltage several times that of the scan-register grid in order to achieve convergence of the electron beam, the beam will be focussed between each pair of elements of the scan-register grid. In order to focus on but one phosphor strip at a time, it becomes necessary to resort to a grid wire 32 for each separate strip, as shown in Figs. 3 and 4. In addition, if a blank strip is positioned between each color triplet, every fourth grid wire corresponds to the signal elements of Figs. 1 and 2. The grid wires 32 of Figs. 3 and 4 are preferably positioned at the boundary of the two adjacent strips so that each strip, including the blank strip, has a grid wire arranged opposite the leading and trailing edges thereof.

If the various grid wires of the scan-register grid were of equal size and secondary emission coefficient, four signals of substantially equal amplitude would be produced for each set of four strips as the beam strikes each grid wire in traversing the fluorescent screen. Because of this, ambiguity ordinarily would result in the color coder in connection with the color programming. By making every fourth grid wire, that is the grid wires opposite the leading edge of the blank strip 25, larger than the other three grid wires, as shown in Fig. 3, the scan-register signal derived when the beam impinges upon the larger grid wires will be of considerably greater amplitude than the other three adjacent signals. The color coder will now be keyed into operation only by the large amplitude scan-register signal.

Instead of making every fourth grid wire of larger size than the remaining wires, the grid wires may all be of the same size and every fourth grid wire, which is to produce the effective scan-register signal, may either be coated with a material 39 having a markedly different secondary emission coefficient than that of the adjacent grid wires, as shown in Fig. 4, or else made entirely of a material having a greater secondary emission coefficient than that of the remaining grid wires. The choice between a coated or a solid grid wire will depend on such factors as availability, cost, electrical conductivity, ductility and rigidity of the material chosen for its relatively high secondary emission coefficient.

Figure 5:
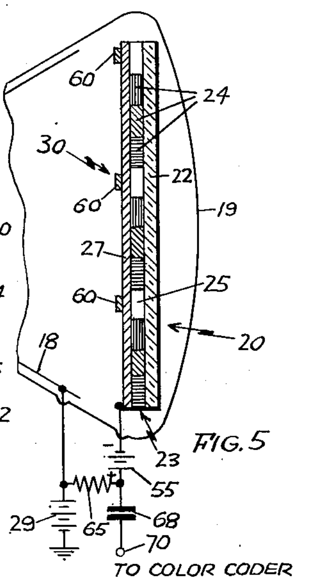
Fig. 5 is a view illustrating a modification of the tube and output circuitry of the embodiment of Fig. 1.
Figure 6:
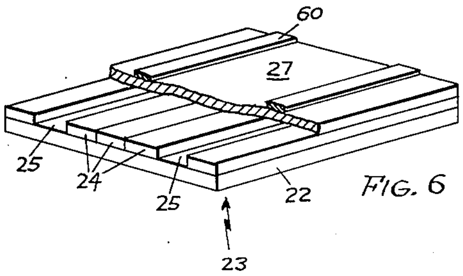
Fig. 6 is a detailed view showing the relationship between the scan-register grid elements and the target electrode.

A further modification of the scan-register grid 30 is shown in Figs. 5 and 6 which contemplates mounting of the signal elements or strips of the scan-register grid directly upon the fluorescent screen coating 27 rather than in spaced relation therewith. As shown in Figs. 5 and 6, vertically arranged strips 60 of a material, such as nickel, having a secondary emission co-efficient materially different from that of the fluorescent screen coating 27 are formed in contact with coating 27 and in register with the blank strips 25 of fluorescent screen 23. This may be done, for example, by covering the metalized coating 27 with a mask having slits corresponding to the desired signal elements 60 and evaporating the metal of which the strips are to be made through this mask. A single terminal blank is connected to the fluorescent screen coating 27. A biasing source 55, such as a battery, is connected between the fluorescent screen coating 27 (which carries the strips 60 of the scan-register grid 30) and accelerating anode 18 and the aquadag 18 so that the fluorescent screen coating 27 is maintained sufficiently negative relative to the accelerating anode or aquadag 18 that secondary emission to the latter is saturated. An output resistor 65 is connected between the accelerating anode 18 and coating 27 in series with a biasing source. If a constant current beam is scanned across the fluorescent screen, a pulse of current will flow through output resistor 65 whenever the beam crosses one of the signal elements of strip 60. This scan-register signal will be superimposed upon the modulation produced by the video signals when a color picture is being reproduced. Because of the greater or smaller secondary emission from the signal elements of the scan-register grid 60, depending upon whether the secondary emission ratio of the signal elements is respectively greater or less than the secondary emission ratio of the fluorescent screen coating, the current is correspondingly greater or smaller when the beam impinges on one of the signal elements 60 than when the beam strikes fluorescent screen 27. The scan-register signals may be capacitively coupled to the color coder circuitry by means of capacitor 68.

The scan-register signals may be separated from the video information on the basis of amplitude. An amplitude sensitive translation device, such as an amplifier biased well below cut-off, may be inserted between the output terminal 70 of the tube and the color coder so that only the higher amplitude scan-register signals may be transmitted.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, and means responsive only to the interception of said electron beam by said signal elements for producing control signals independently of the presence of said video information.

2. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, means responsive only to the interception of said electron beam by said signal elements for producing control signals independently of the presence of said video information, and coding means triggered into operation solely by said control signals for modulating said electron beam with video information concerning a given primary component color in synchronism with the traversal by said beam of a phosphor area corresponding to that primary component color.

3. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, and means including said beam intercepting grid for deriving control signals only during the traversal of said electron beam across, said blank areas independently of said video information.

4. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and including a series of spaced signal elements arranged parallel to and in alignment with corresponding blank areas, deflection means for scanning said beam along said fluorescent screen in a direction substantially normal to said given direction, means including said beam intercepting grid for deriving control signals only during the traversal of said electron beam across said blank areas, and coding means triggered into operation solely by said control signals for modulating said electron beam with video information concerning a given primary component color in synchronism with the traversal by said beam of a phosphor area corresponding to that primary component color, said coding means further permitting derivation of a fixed potential during the traversal of said beam past said blank areas.

5. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grip spaced from said fluorescent screen and including a series of spaced signal elements arranged parallel to and in alignment with corresponding blank areas, deflection means for scanning said beam along said fluorescent screen in a direction substantially normal to said given direction, and means responsive only to the interception of said electron beam by said signal elements for producing control signals independently of the presence of said video information.

6. In combination, a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid spaced from said fluorescent screen and including a series of spaced signal elements arranged parallel to and in alignment with corresponding blank areas, deflection means for scanning said beam along said fluorescent screen in a direction substantially normal to said given direction, means responsive only to the interception of said electron beam by said signal elements for producing control signals independently of the presence of said video information, and coding means triggered into operation by said control signals for modulating said electron beam with video information concerning a given primary component color in synchronism with the traversal by said beam of a phosphor area corresponding to that primary component color.

7. In combination, a cathode ray tube including means for producing an electron beam, a fluorescent screen including a plurality of recurrent groups of elongated phosphor areas extending along said screen in a given direction and a plurality of elongated blank areas positioned between adjacent ones of said groups, each of said phosphor areas of a given group being productive of light of a different primary color when interceptive of said electron beam, an electron-permeable electrically conductive layer disposed in contact with said fluorescent screen, a beam intercepting grid electrically insulated from said fluorescent screen and including a multiplicity of spaced signal elements arranged parallel to and in alignment with corresponding blank areas and capable of emitting secondary electrons when impinged upon by said electron beam, means for maintaining said grid negative with respect to said layer, deflection means for recurrently scanning said beam along said fluorescent screen in a direction substantially normal to said given direction, means responsive only to the interception of said beam by said signal elements for producing control signals, means for generating video signals corresponding to each of said primary colors, a source of fixed potential, and coding means triggered into operation by said control signals for modulating the intensity of said beam during the traversal of said beam past a phosphor area of a given primary color in accordance with a video signal representative of information concerning that primary color.

8. In combination, a cathode ray tube including means for producing an electron beam, an electron beam intensity control electrode, a fluorescent screen including a plurality of recurrent groups of elongated phosphor areas extending along said screen in a given direction and a plurality of elongated blank areas positioned between adjacent ones of said groups, each of said phosphor areas of a given group being productive of light of a different primary color when interceptive of said electron beam, an electron-permeable electrically conductive layer disposed in contact with said fluorescent screen, a beam intercepting grid positioned adjacent said fluorescent screen and including a multiplicity of spaced signal elements arranged parallel to and in alignment with corresponding blank areas and capable of emitting secondary electrons when impinged upon by said electron beam, deflection means for recurrently scanning said beam along said fluorescent screen in a direction substantially normal to said given direction, means responsive only to the interception of said beam by said signal elements for producing control signals, means for generating video signals corresponding to each of said primary colors, a source of fixed potential, and coding means triggered into operation by said control signals for modulating the intensity of said beam during the traversal of said beam past a phosphor area of a given primary color in accordance with a video signal representative of information concerning that primary color, said coding means further permitting application of said fixed potential to said intensity control electrode during the traversal of said beam past said blank areas.

9. In combination, a cathode ray tube including means for producing an electron beam, an electron beam intensity control electrode, a fluorescent screen including a plurality of recurrent groups of elongated phosphor areas extending along said screen in a given direction and a plurality of elongated blank areas positioned between adjacent ones of said groups, each of said phosphor areas of a given group being productive of light of a different primary color when interceptive of said electron beam, an electron permeable electrically conductive layer disposed in contact with said fluorescent screen, a beam intercepting grid positioned in contact with said layer and including a multiplicity of spaced signal elements arranged parallel to and in alignment with corresponding blank areas and capable of emitting secondary electrons when impinged upon by said electron beam, deflection means for recurrently scanning said beam along said fluorescent screen in a direction substantially normal to said given direction, means responsive only to the interception of said beam by said signal elements for producing control signals, means for generating video signals corresponding to each of said primary colors, a source of fixed potential, and coding means triggered into operation by said control signals for modulating the intensity of said beam during the traversal of said beam past a phosphor area of a given primary color in accordance with a video signal representative of information concerning that primary color, said coding means further permitting application of said fixed potential to said intensity control electrode during the traversal of said beam past said blank areas.

10. In combination a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements each in alignment with the boundary of two adjacent areas of the fluorescent screen, deflection means for recurrently scanning said beam along said fluorescent screen in a direction substantially normal to said given direction, and means responsive only to the interception of said electron beam by those of said elements lying adjacent the boundary of a given blank area and the phosphor area immediately preceding said given blank area for deriving control signals independently of the presence of said video information.

11. In combination a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements each in alignment with the boundary of two adjacent areas of the fluorescent screen, deflection means for recurrently scanning said beam along said fluorescent screen in a direction substantially normal to said given direction, means responsive only to the interception of said electron beam by those of said elements lying opposite the boundary of a given blank area and the phosphor area immediately preceding said given blank area for deriving control signals independently of the presence of said video information, and coding means triggered into operation by said control signals for modulating said electron beam with video information concerning a given primary component color in synchronism with the traversal by said beam of a phosphor area corresponding to that primary component color, said coding means further permitting derivation of a fixed potential during the traversal of said beam past said blank areas.

12. In combination a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements each in alignment with the boundary of two adjacent areas of the fluorescent screen, those of said elements lying adjacent the boundary of a blank area and the phosphor area immediately preceding this blank area being of larger size than the remaining elements, deflection means for recurrently scanning said beam along said fluorescent screen in a direction substantially normal to said given direction, and means responsive only to the interception of said electron beam by those of said elements of larger size for deriving control signals independently of the presence of said video information.

13. In combination a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements each in alignment with the boundary of two adjacent areas of the fluorescent screen, those of said elements lying opposite the boundary of a blank area and the phosphor area immediately preceding this blank area being of larger size than the remaining elements, deflection means for recurrently scanning said beam along said fluorescent screen in a direction substantially normal to said given direction, means responsive only to the interception of said electron beam by those of said elements of larger size for deriving control signals independently of the presence of said video information, and coding means triggered into operation by said control signals for modulating said electron beam with video information concerning a given primary component color in synchronism with the traversal by said beam of a phosphor area corresponding to that primary component color, said coding means further permitting derivation of a fixed potential during the traversal of said beam past said blank areas.

14. In combination a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements each in alignment with the boundary of two adjacent areas of said fluorescent screen, those of said elements lying adjacent the boundary of a given blank area and the phosphor area immediately preceding said given blank area having a greater secondary emission ratio than the remaining elements, deflection means for recurrently scanning said beam along said fluorescent screen in a direction substantially normal to said given direction, and means responsive only to the interception of said electron beam by those of said elements of greater secondary emission ratio for deriving control signals independently of the presence of said video information.

15. In combination a cathode ray tube adapted to receive video information corresponding to the presence of primary component colors in a televised scene and including means for producing an electron beam, a fluorescent screen composed of a plurality of recurrent groups of elongated phosphor areas extending along said screen in a given direction and a plurality of blank areas positioned between adjacent ones of said groups, each of said phosphor areas of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements each in alignment with the boundary of two adjacent areas of said fluorescent screen, those of said elements lying adjacent the boundary of a given blank area and the phosphor area immediately preceding said given blank area having a greater secondary emission ratio than the remaining elements, deflection means for recurrently scanning said beam along said fluorescent screen in a direction substantially normal to said given direction, means responsive only to the interception of said electron beam by those of said elements of greater secondary emission ratio for deriving control signals independently of the presence of said video information, and coding means triggered into operation by said control signals for modulating said electron beam with video information concerning a given primary component color in synchronism with the traversal by said beam of a phosphor area corresponding to that primary component color, said coding means further permitting derivation of a fixed potential during the traversal of said beam past said blank areas.

16. In combination a cathode ray tube adapted to receive video information corresponding to the presence of primary component colors in a televised scene and including means for producing an electron beam, a fluorescent screen composed of a plurality of recurrent groups of parallel elongated phosphor strips extending along said screen in a given direction and a plurality of blank strips positioned between adjacent ones of said groups and parallel to said phosphor strips, each of said phosphor strips of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements one for each strip of said fluorescent screen, those of said elements cooperating with said blank areas having a greater secondary emission ratio than the remaining elements, deflection means for recurrently scanning said beam along said fluorescent screen in a direction substantially normal to said given direction, and means responsive only to the interception of said electron beam by those of said elements of greater secondary emission ratio for deriving control signals independently of the presence of said video information.

17. In combination a cathode ray tube adapted to receive video information corresponding to the presence of primary component colors in a televised scene and including means for producing an electron beam, a fluorescent screen composed of a plurality of recurrent groups of parallel elongated phosphor strips extending along said screen in a given direction and a plurality of blank strips positioned between adjacent ones of said groups and parallel to said phosphor strips, each of said phosphor strips of a given group being productive of light of a different primary color when interceptive of said electron beam, a beam intercepting grid positioned adjacent said fluorescent screen and spaced therefrom, means for producing an accelerating field in the region of said beam intercepting grid whereby said beam is focussed on said fluorescent screen, said grid including a series of spaced elements one for each strip of said fluorescent screen, those of said elements cooperating with said blank strips having a greater secondary emission ratio than the remaining elements, deflection means for recurrently scanning said beam along said fluorescent screen in a direction substantially normal to said given direction, means responsive only to the interception of said electron beam by those of said elements of greater secondary emission ratio for deriving control signals independently of the presence of said video information, and coding means triggered into operation by said control signals for modulating said electron beam with video information concerning a given primary component color in synchronism with the traversal by said beam of a phosphor strip corresponding to that primary component color, said coding means further permitting derivation of a fixed potential during the traversal of said beam past said blank areas, said coding means further permitting derivation of a fixed potential during the traversal of said beam past said blank strips.

References Cited in the file of this patent

UNITED STATES PATENTS 2,648,722 Bradley ---------------- Aug. 11, 1953
2,669,675 Lawrence ---------------- Feb. 16, 1954
2,674,651 Creamer ---------------- Apr. 6, 1954